Sept. 18, 1934.  D. C. BANKERT  1,973,891
AUTOMATIC BACK DRIFT BRAKE FOR MOTOR VEHICLES
Filed July 26, 1933   3 Sheets-Sheet 1
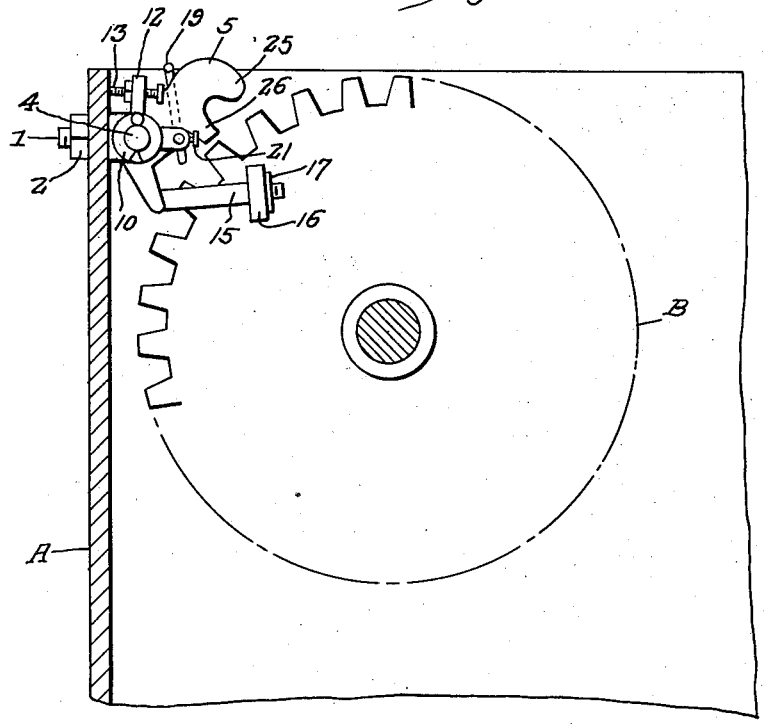
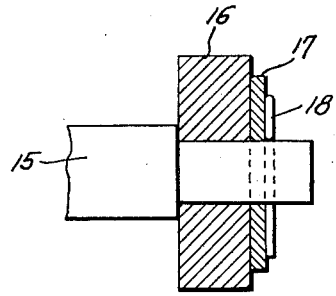
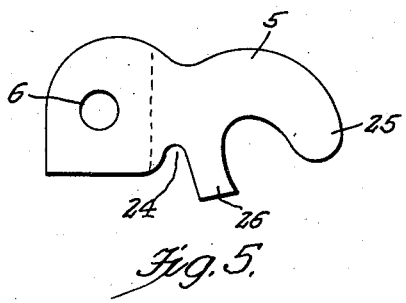
Inventor
David C. Bankert,
By *Clarence A. O'Brien*
Attorney Sept. 18, 1934.  D. C. BANKERT  1,973,891
AUTOMATIC BACK DRIFT BRAKE FOR MOTOR VEHICLES
Filed July 26, 1933  3 Sheets—Sheet 2
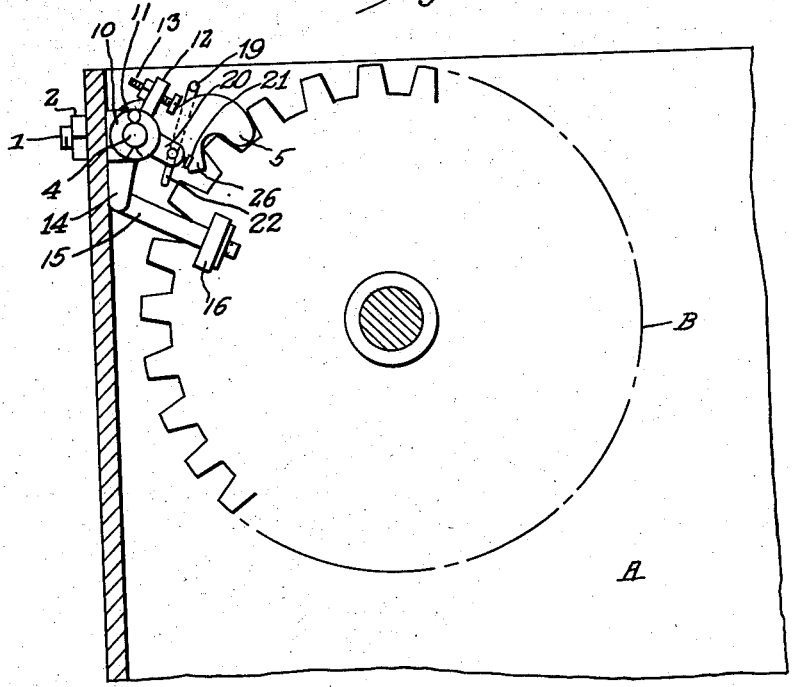
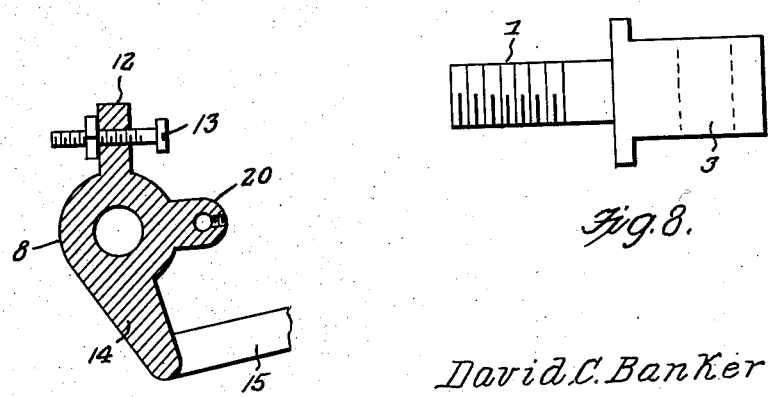
Inventor
David C. Bankert,
By Clarence A. O'Brien
Attorney Sept. 18, 1934. D. C. BANKERT 1,973,891
AUTOMATIC BACK DRIFT BRAKE FOR MOTOR VEHICLES
Filed July 26, 1933 3 Sheets-Sheet 3
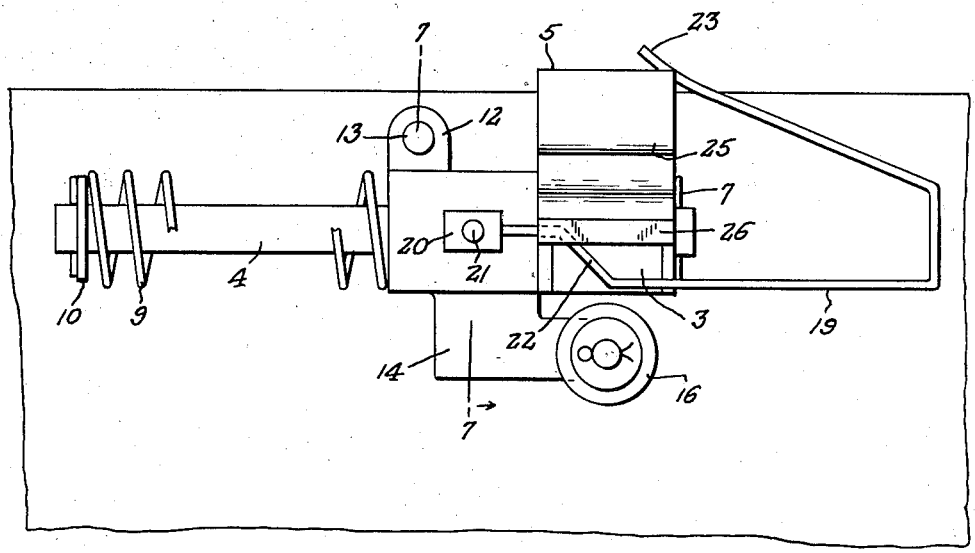
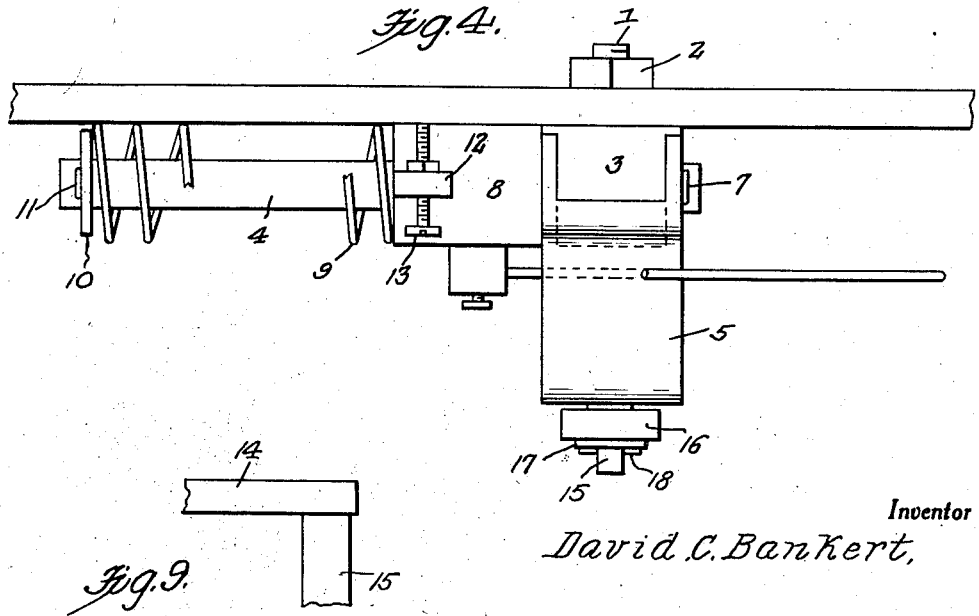
Inventor
David C. Bankert,
By Clarence A. O'Brien
Attorney Patented Sept. 18, 1934

1,973,891

UNITED STATES PATENT OFFICE 1,973,891

AUTOMATIC BACK-DRIFT BRAKE FOR MOTOR VEHICLES

David C. Bankert, Union Bridge, Md.

Application July 26, 1933, Serial No. 682,338

4 Claims. (Cl. 192—4)

This invention relates to a back-drift brake for motor vehicles, the general object of the invention being to provide means, automatically operated by the shifting action of the transmission means of the vehicle into low speed, for automatically applying the brake to prevent backward movement of the vehicle, with means for preventing the brake from interfering with forward movement thereof.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a sectional view through portion of the transmission housing of a vehicle, showing the invention associated with the low speed gear, and with the parts in inoperative position.

Figure 2 is a similar view, but showing the parts in operating or braking position.

Figure 3 is an elevation of the invention, with the brake in raised position.

Figure 4 is a top plan view.

Figure 5 is a side view of the pawl.

Figure 6 is a sectional detail view showing the means for mounting the roller on its arm.

Figure 7 is a section on line 7—7 of Figure 3.

Figure 8 is a view of the bolt to which the pawl is pivoted.

Figure 9 is a fragmentary view of the roller carrying angle arm.

In these drawings, the letter A indicates a part of the transmisison housing and the letter B the low speed gear of the transmission means.

In carrying out my invention, I bore a hole in a part of the housing to receive the bolt 1 which has a nut 2 threaded on its outer end and the head 3 is located within the housing and has an opening therein through which one end of a shaft 4 passes and the forked end of a pawl 5 straddles the head and has openings 6 therein through which the shaft passes. A cotter pin 7 passes through the adjacent end of the shaft to hold the parts assembled. A tubular member or sleeve 8 has sliding movement on the shaft 4, but is normally held against the pawl by a spring 9 on the shaft, one end of which abuts the tubular member or sleeve 8 and the other abuts a washer 10 held on the shaft by a cotter pin 11. The sleeve 8 has a projection 12 on its upper part having a threaded hole therein for receiving an adjusting screw 13 which is adapted to engage a part of an internal wall of the housing to limit upward movement of the pawl and said sleeve has a depending arm 14 to which an angle arm 15 is connected, the long limb of this arm being reduced at its free end to receive a roller 16 which is held against the shoulder formed by the reduced end by the washer 17 and the cotter pin 18. A substantially U-shaped spring 19 has a long limb, the end of which is held in a stud 20, formed on the sleeve 8, by a set screw 21, and this long limb has an outwardly offset part 22 and the extremity of the short limb extends outwardly, as shown at 23. The pawl has a groove 24 therein for receiving the parts of the long limb and the free end of the short limb is adapted to engage the top of the pawl during shifting movement of the U-shaped member 19.

This pawl is formed with a rounded engaging end 25 for engaging the teeth of the gear B, or rather between the teeth, and it is also provided with a projecting part 26, the free end of which is substantially flat.

The weight of the parts acts to hold the device with the arm 14 resting against a portion of the wall of the housing, as shown in Figure 2, and the spring 9 normally holds the sleeve or tubular member 8 against one of the ears or prongs of the pawl. In this position of the parts, shown in Figure 2, the offset portion 22 of the U-shaped member 19 will engage the groove 24 in the pawl and hold the pawl in raised position. Also in this raised position, the end 23 of the U-shaped member will be pressing against the pawl and tends to move it downwardly. As will be seen from Figures 1 and 2, the roller carrying arm 15 of the sleeve extends across the low speed gear B, so that when this gear is shifted to place the parts in low speed position, it will contact the roller 16 and force the sleeve 8 and the parts carried thereby toward the free end of the shaft and against the action of the spring 9. This movement of the sleeve 8 will carry the U-shaped member 19 with it, so that the offset part 22 will move out of the groove 24 and the short limb of the U-shaped member, bearing against the top of the pawl, will move the pawl downwardly so that the rounded part 25 will enter the space between two of the teeth. Should the gear tooth and pawl not be even, the part or projection 26 would prevent the latch or pawl from engaging an outer edge of a tooth and the car would move rearwardly about one-half an inch when the part 25 of the pawl would come opposite a space between two of the teeth of the gear and thus the pawl would mesh with the gear. Then when the gear moves in a direction to drive the car forwardly, the engagement of the roller 16 with the face of the gear would cause the roller and the arm to move with the rotation of the gear so that the sleeve would turn on the shaft 4, which would cause the U-shaped member 19 to move the pawl out of engagement with the gear, as shown in Figure 1, and the parts will remain in this position as long as the car is moving forwardly in low gear. As will be understood, when the gear B is moved forwardly into low speed position, the sleeve 8 is moved toward the left in Figure 3, though the arm 14 remains in contact with a vertical wall of the housing, as shown in Figure 2, and during the movement to the left of the sleeve 8, the U-shaped member 19 has its part 22 moved out of the groove 24 in the pawl so that the pawl will drop into a space between a pair of teeth of the gear B. This will prevent reverse movement of the gear so that the vehicle cannot move rearwardly, but upon forward movement of the gear, the roller 16 and the arm 15 will be carried upwardly with the gear so that the sleeve 8 will move from the position shown in Figure 2 to that shown in Figure 1 and the pawl is raised, as shown in Figure 1 by engagement of the long straight outer part of the lower limb of the U-shaped member 19 with a wall of the groove 24 in the pawl, for, of course, as the part 22 moves from under the pawl, this straight part will pass under the pawl, but will be spaced from the same so the pawl can drop onto the gear B. Thus the pawl is raised above the gear so that the gear can rotate in a forward direction.

As will be seen, the spring U-shaped member 19 serves not only to lift the pawl to inoperative position, but it also acts to press the pawl downwardly.

When the car is shifted out of low gear, the roller 16 follows the gear, due to the pressure of the spring 9 and this action causes the U-shaped member to relieve pressure of its short arm on the top of the pawl and the offset part 22 applies pressure on the lower part of the pawl so that the pawl is raised to its original position.

Should the motor stall after a forward motion sufficient to lift the pawl to the running position, it would require but a slight backward motion of the vehicle to again engage the pawl with the gear, thus holding the car until the motor is again started.

Attention is called to the projection 26 on the pawl which prevents partial engagement of the pawl with the gear, thus preventing the breaking of the teeth of the gear.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination with a transmission of a motor vehicle including the housing and low speed gear, a latch for engaging the gear to prevent backward movement of the vehicle, means for operating the latch by shifting and rotary movement of said gear, and means for preventing engagement of the latch with the outer face of a tooth of the gear as the latch comes into engagement with the gear.

2. In combination with the transmission means of a motor vehicle including the housing and low speed gear, a shaft supported in the housing adjacent the gear, a pawl pivoted to the shaft and adapted to engage the gear when in lowered position, a sleeve slidably arranged on the shaft, a roller carrying arm on the sleeve, the roller of which is located in the path of shifting movement of the gear, a spring for holding the sleeve against the pawl, and means for moving the pawl downwardly into engagement with the gear when the sleeve is moved on the shaft by shifting motion of the gear, such means also raising the pawl upon forward rotary movement of the gear.

3. In combination with the transmission means of a motor vehicle including the housing and low speed gear, a shaft supported in the housing adjacent the gear, a pawl pivoted to the shaft and adapted to engage the gear when in lowered position, a sleeve slidably arranged on the shaft, a roller carrying arm on the sleeve, the roller of which is located in the path of shifting movement of the gear, a spring for holding the sleeve against the pawl, means for moving the pawl downwardly into engagement with the gear when the sleeve is moved on the shaft by shifting motion of the gear, such means also raising the pawl upon forward rotary movement of the gear, and a projection on the pawl for preventing engagement of the pawl with the outer face of a tooth of the gear when the pawl comes into engagement with the gear.

4. A back-drift brake for motor vehicles comprising a shaft supported in the transmission housing of the vehicle, a pawl pivotally supported by the shaft, a sleeve slidably arranged on the shaft, a spring on the shaft for normally holding the sleeve against the pawl, an arm carried by the sleeve, a roller on the arm engaged by the low speed gear of the transmission when the same is shifted to low speed position, for moving the sleeve against the action of the spring, a spring U-shaped member connected with the sleeve and having an offset part for engaging a part of the pawl for holding the same in raised position but releasing the pawl when the sleeve is moved against the action of the spring, said U-shaped member having a limb engaging the upper end of the pawl for pressing the same downwardly when the sleeve is shifted against the action of the spring, said sleeve being rotated in an upward direction by forward rotary movement of the gear, whereby the U-shaped member raises the pawl, and a set screw for limiting the upward movement of the sleeve.

DAVID C. BANKERT.